United States Patent
Oren et al.

(10) Patent No.: US 11,522,777 B2
(45) Date of Patent: Dec. 6, 2022

(54) METHOD AND SYSTEMS TO MONITOR AND ISOLATE ISSUES OVER LAYER1 PATHS USING FLEXE CLIENT OAM

(71) Applicant: Avago Technologies International Sales Pte. Limited, Singapore (SG)

(72) Inventors: Eyal Oren, Yakum (IL); Amir Sheffer, Tel Aviv (IL)

(73) Assignee: Avago Technologies International Sales Pte. Limited, Singapore (SG)

( * ) Notice: Subject to any disclaimer, the term of this patent is extended or adjusted under 35 U.S.C. 154(b) by 78 days.

(21) Appl. No.: 16/782,649

(22) Filed: Feb. 5, 2020

(65) Prior Publication Data

US 2020/0259728 A1 Aug. 13, 2020

Related U.S. Application Data

(60) Provisional application No. 62/802,655, filed on Feb. 7, 2019.

(51) Int. Cl.
| | |
|---|---|
| *H04L 12/26* | (2006.01) |
| *H04L 43/062* | (2022.01) |
| *H04L 43/0811* | (2022.01) |
| *H04L 43/0852* | (2022.01) |
| *H04L 43/0829* | (2022.01) |
| *H04L 43/10* | (2022.01) |

(52) U.S. Cl.
CPC ........ *H04L 43/062* (2013.01); *H04L 43/0811* (2013.01); *H04L 43/0829* (2013.01); *H04L 43/0852* (2013.01); *H04L 43/10* (2013.01)

(58) Field of Classification Search
CPC ....... H04L 41/26; H04L 43/062; H04L 43/08; H04L 43/0811; H04L 43/0829; H04L 43/0852; H04L 43/10
See application file for complete search history.

(56) References Cited

U.S. PATENT DOCUMENTS

| | | | |
|---|---|---|---|
| 6,650,660 B1 * | 11/2003 | Koehler | H04Q 11/0478 370/510 |
| 2003/0217178 A1 * | 11/2003 | Yoshimura | H04N 1/33307 709/239 |
| 2014/0362678 A1 * | 12/2014 | Koh | H04L 49/351 370/216 |
| 2017/0005742 A1 * | 1/2017 | Gareau | H04L 25/49 |
| 2020/0220650 A1 * | 7/2020 | Cheng | H04L 1/0008 |
| 2020/0396097 A1 * | 12/2020 | Deng | H04L 49/351 |

* cited by examiner

*Primary Examiner* — Jason E Mattis
*Assistant Examiner* — Bao G Nguyen
(74) *Attorney, Agent, or Firm* — Foley & Lardner LLP

(57) ABSTRACT

In some aspects, the disclosure is directed to methods and systems for monitoring and isolating issues over physical layer (layer 1) paths using Flexible Ethernet (FlexE) protocols via client-based operations, administration, and maintenance (OAM) management. Each node within a FlexE communications path may dynamically insert, extract, and/or replace OAM messages from FlexE data streams as needed to ensure that the OAM messages may be provided unimpeded to a destination (e.g. monitoring server or other device), as well as inserting additional monitoring data (e.g. bit error rates, delay measurements, loss measurements, threshold crossing alerts, or other such monitoring notifications or data) for intermediary nodes.

16 Claims, 9 Drawing Sheets

METHOD AND SYSTEMS TO MONITOR AND ISOLATE ISSUES OVER LAYER1 PATHS USING FLEXE CLIENT OAM

RELATED APPLICATIONS

This application claims the benefit of and priority as to U.S. Provisional Application No. 62/802,655, entitled "Methods and Systems to Monitor and Isolate Issues over Layer 1 Paths Using FlexE Client OAM," filed Feb. 7, 2019, the entirety of which is incorporated by reference herein.

FIELD OF THE DISCLOSURE

This disclosure generally relates to systems and methods for operations, administration, and maintenance (OAM) over Flexible Ethernet (FlexE) protocols.

BACKGROUND OF THE DISCLOSURE

Flexible Ethernet (FlexE) provides enhanced functionality and capabilities beyond that of standard Ethernet-connected devices, but may raise issues with operations, administration, and maintenance (OAM) management, particularly in mixed deployments (e.g. where both FlexE-compatible and -incompatible devices are interconnected). For example, many OAM monitoring implementations are defined as end-to-end connections or sessions, agnostic to the various layer 1 physical nodes between intermediary devices traversed by the session. As a result, OAM message communication may be interrupted. Furthermore, FlexE-compatible intermediary devices may not be able to communicate their own status messages if they are in the middle of an end-to-end communication.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

- Section A describes embodiments of systems and methods for monitoring and isolating issues over a Layer 1 Path using FlexE Client OAM messaging; and
- Section B describes a network environment and computing environment which may be useful for practicing embodiments described herein.

A. Methods and Systems to Monitor and Isolate Issues Over Layer 1 Paths Using FlexE Client OAM Flexible Ethernet (FlexE) provides enhanced functionality and capabilities beyond that of standard Ethernet-connected devices, but may raise issues with operations, administration, and maintenance (OAM) management, particularly in mixed deployments (e.g. where both FlexE-compatible and -incompatible devices are interconnected). For example, many OAM monitoring implementations are defined as end-to-end connections or sessions, agnostic to the various layer 1 physical nodes between intermediary devices traversed by the session. As a result, OAM message communication may be interrupted. Furthermore, FlexE-compatible intermediary devices may not be able to communicate their own status messages if they are in the middle of an end-to-end communication.

Figure 1A:
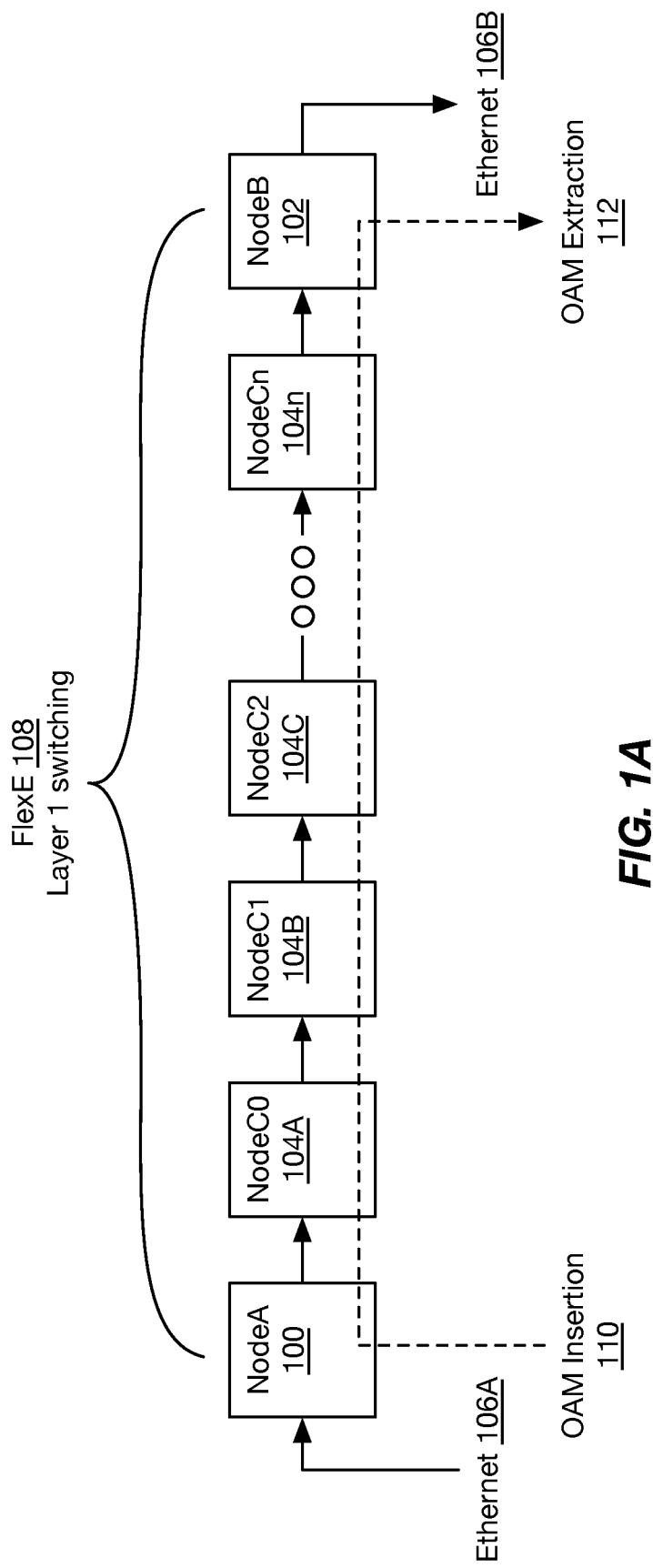
FIG. 1A is a block diagram depicting an embodiment of a network environment utilizing FlexE communications and OAM messaging.

For example, referring first to FIG. 1A, illustrated is a block diagram depicting an embodiment of a network environment utilizing FlexE communications and OAM messaging. As shown, a first node 100 ("NodeA") may communicate with a second node 102 ("NodeB") via a FlexE communications path 108 via one or more FlexE-compatible intermediary devices 104A-104n ("NodeC0" through "NodeCn"). Each of NodeA and NodeB 100, 102 may communicate with an Ethernet network 106A, 106B respectively, which may comprise one or more additional nodes or other devices (although shown as an Ethernet network, networks 106A, 106B may comprise any type and form of network, including Ethernet, FlexE, cellular, etc.). As shown, OAM messages may be inserted 110 by NodeA 100. In some implementations, these OAM messages, including monitoring data (e.g. bit error rates, delay measurements, loss measurements, threshold crossing alerts, or other such monitoring notifications or data) or other such information, may be inserted in place of Ethernet Idle control messages. The data may be forwarded through each intermediary node unaltered until extraction 112 by NodeB 102, allowing end-to-end monitoring of the FlexE path 108. Although shown as a separate line, OAM data is transmitted in band within each frame.

However, as discussed above, because such implementations of OAM messaging are end-to-end, they do not allow isolation of a problem with an intermediary device (e.g. a problem with node C1 104B, for example. Resolving problems with intermediary nodes thus because difficult or nigh impossible. Specifically, because standard OAM messages are end-to-end, it may be difficult to detect and isolate problems within a communications path. For example, given a high bit error rate or delay identified between NodeA 100 and NodeB 102, it may be unclear which intermediary link or node is a source of the problem.

Furthermore, such implementations require each intermediary node 104A-104n to be compatible and properly forward the OAM messages. In mixed deployments or deployments utilizing legacy devices, this requirement may not be met. Even where each of node 104A-104n is compatible, OAM messages may not necessarily be provided through Ethernet connections 106A-106B; accordingly, if further FlexE deployments are connected, OAM messages may be lost at an Ethernet portion of the communications path. To address these problems, in one implementation of the systems and methods provided herein, each node may dynamically insert, extract, and/or replace OAM messages from FlexE data streams as needed to ensure that the OAM messages may be provided unimpeded to a destination (e.g. monitoring server or other device), as well as inserting additional monitoring data (e.g. bit error rates, delay measurements, loss measurements, threshold crossing alerts, or other such monitoring notifications or data) for intermediary nodes.

Figure 1B:
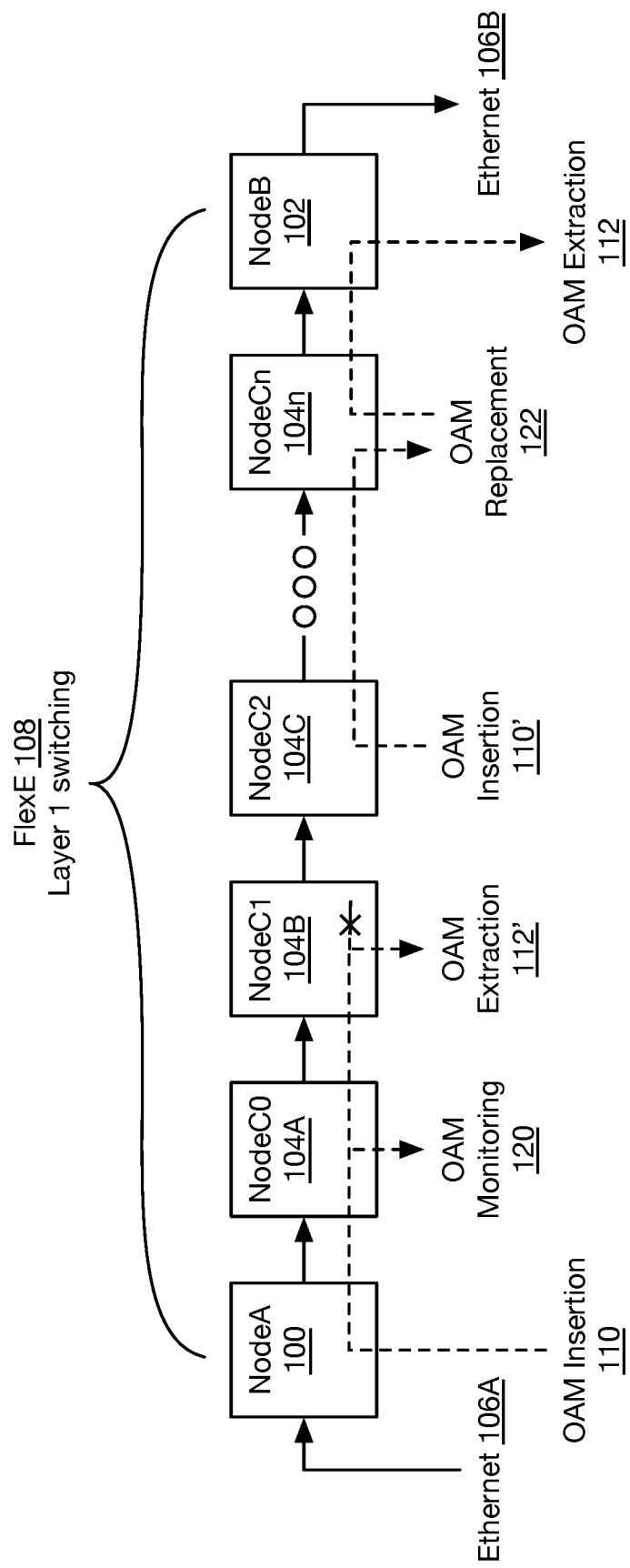
FIG. 1B is a block diagram depicting an embodiment of a network environment utilizing improved FlexE client OAM messaging for monitoring and isolating issues.

Referring to FIG. 1B, illustrated is a block diagram depicting an embodiment of a network environment utilizing improved FlexE client OAM messaging for monitoring and isolating issues. As shown, in addition to the above-mentioned insertion 110 and extraction 112 by end nodes 100, 102, intermediary nodes 104A-104n may also perform insertion 110' and extraction 112', as well as monitoring 120 and replacement 122.

For example, in some implementations, an intermediary node may perform OAM monitoring 120 and may extract OAM data from FlexE packets traversing the device without removing it from the FlexE stream (e.g. as shown by NodeC0). The OAM data may still be forwarded on. This may allow a device to receive measurements from upstream devices in order to isolate faults.

Figure 1C:
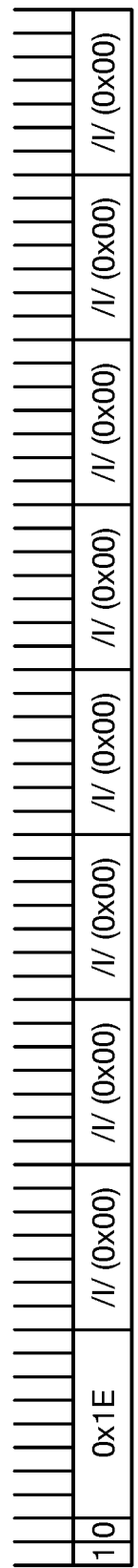
FIG. 1C is a block diagram of an implementation of an Ethernet idle frame.

Furthermore, a node such as intermediary NodeC1 may extract OAM data 112' or terminate transmission of the OAM data, replacing it within the data stream with an FlexE idle block (an implementation of one such idle block is shown in the block diagram of FIG. 1C). This may be done in some implementations because a subsequent device (e.g. a legacy or FlexE-incompatible device, not illustrated) may lack the capability to insert OAM data or does not support Insertion of OAM. The OAM data may be separately transmitted in some implementations to a monitoring server, administrator device, or other computing device.

Conversely, a node such as intermediary NodeC2 may insert OAM data 110' or initiate transmission of the OAM data, replacing an idle block in the data stream with generated OAM data. This may be done if a prior device lacks the capability to insert OAM data or does not support Insertion of OAM, or if a frame otherwise lacks OAM data. In some implementations, a pair of devices (e.g. NodeC1, NodeC2) may respectively extract and insert OAM data in order to bridge an intermediary FlexE-incompatible device (not illustrated) or to isolate nodes for metering or measurement. Such OAM data may be separately transmitted (e.g. as a payload in a higher layer packet, within an options field of a packet header, etc.) between the devices.

For example, given a high error rate or delay detected between NodeA 100 and NodeB 100B, an administrator may "split" monitoring at NodeC1 and NodeC2 by having NodeC1 extract OAM messages inserted by NodeA (and forward them to a monitoring server or network operating system), and having NodeC2 insert OAM messages for forwarding to NodeB (and subsequent forwarding to the monitoring server or network operating system), allowing the administrator to identify which portion of the network path is responsible for the error rate or delay. Further iterations of this process may allow for efficient isolation of network nodes or links for measurement and diagnosis.

Combining these features, in some implementations, a node may replace OAM data 122 by extracting existing data and inserting new data in the frame (e.g. as shown by NodeCn). This may allow a device to insert its own measurements or monitor within the communication path for errors. For example, given Accordingly, by expanding the functionality of these nodes to include intra-path OAM initiation, termination, monitoring, and replacement, each device may perform additional connectivity testing and verification (CC and CV), bit error detection (BIP), and delay measurements (1DM/2DM), as well as providing remote error indications (REI) and remote defect indications (RDI), among other monitoring and error detection/recovery processes. For example, for CC and CV, a device may monitor OAM data traversing its node, such that a first failing node may be able to signal which link has failed. Combining monitoring and initiation, nodes may detect multiple failures, as each failing node will signal the failure of the link to which it is connected.

For BIP, a device may similarly use monitoring and initiation of OAM messages, such that each link on the path may be separately measured and scored, as discussed above. For REI/RDI and DM, nodes may forward and/or monitor OAM messages, for example, allowing calculation of delay through each node to be calculated, as discussed above.

Figure 2:
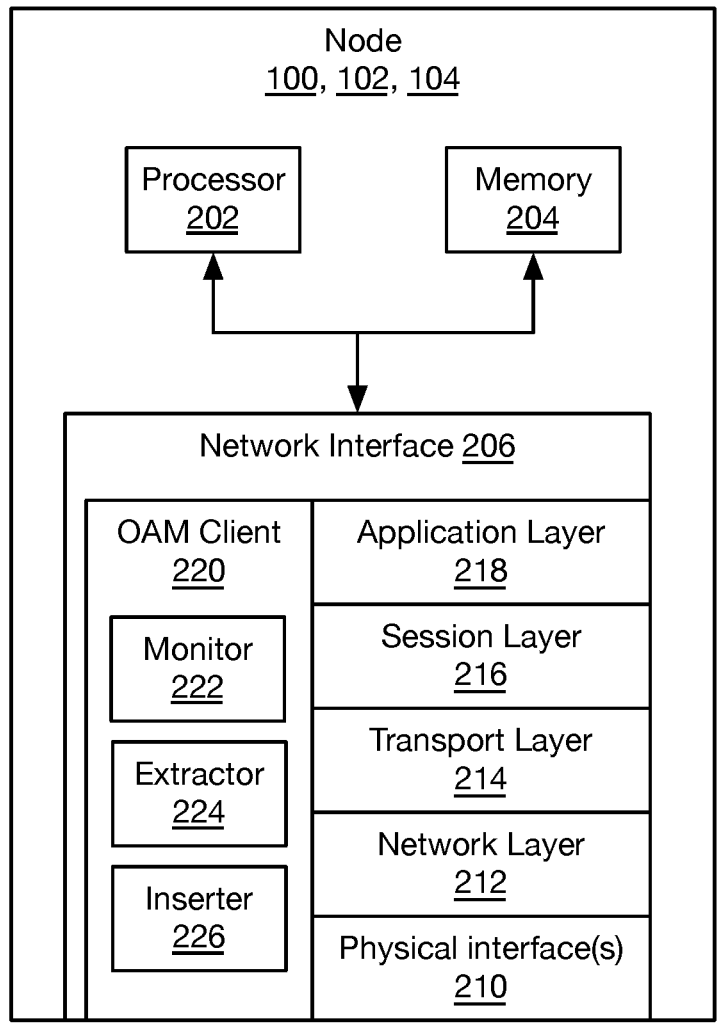
FIG. 2 is a block diagram of an implementation of a computing device utilizing improved FlexE client OAM messaging for monitoring and isolating issues.
Figure 3A:
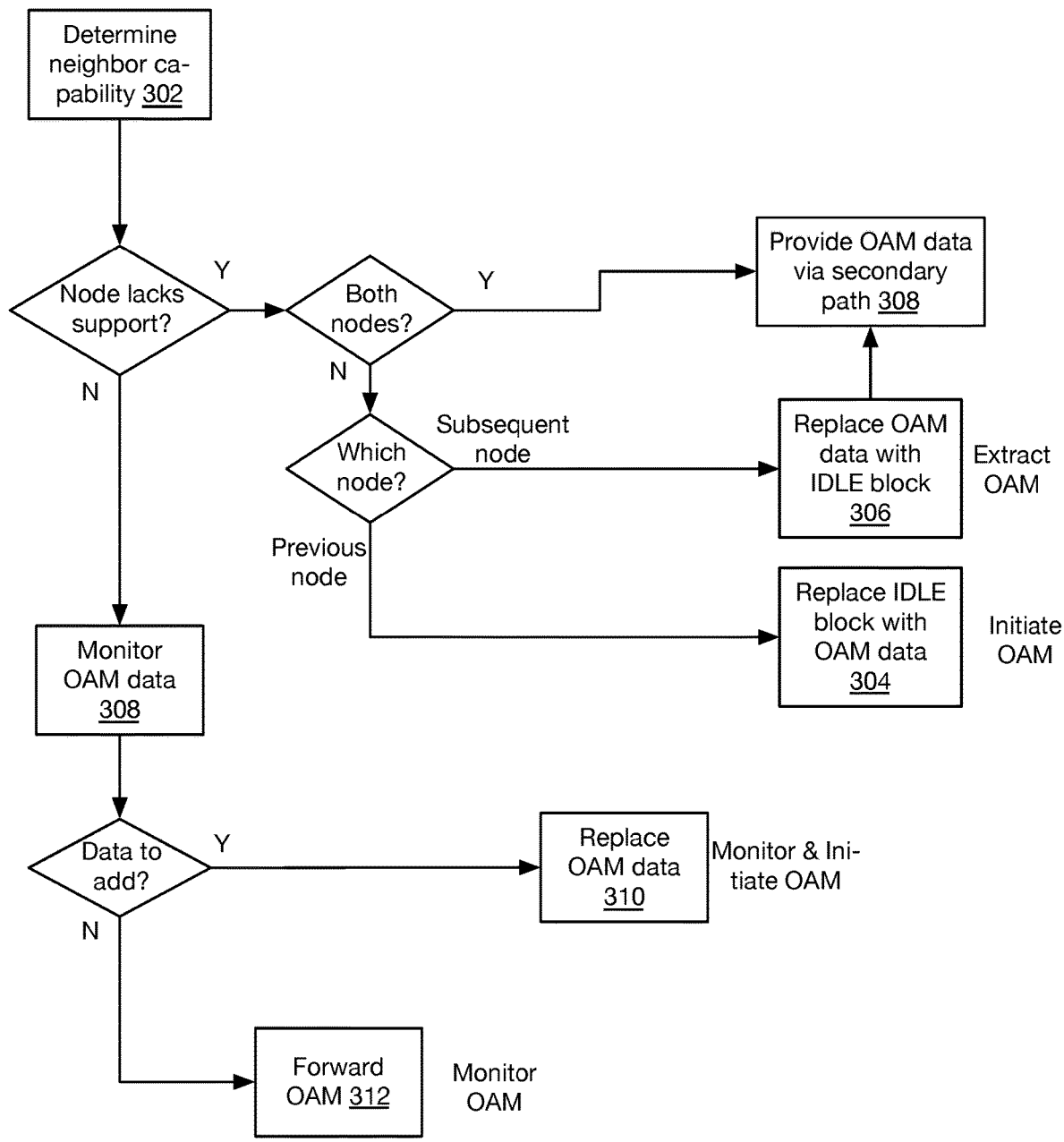
FIG. 3A is a flow diagram of an implementation of a method of improved FlexE client OAM messaging for monitoring and isolating issues.

FIG. 2 is a block diagram of an implementation of a computing device utilizing improved FlexE client OAM messaging for monitoring and isolating issues. A computing device, such as nodes 100, 102, 104, may comprise (among other components) a processor 202, memory 204, and one or more network interfaces 206. Network interface 206 may include a networking stack comprising various layers 210-218. Network interface 206 may also include an OAM client 220 (e.g. executed by a coprocessor of a network interface 206, or OAM client 220 may be stored in memory 204 such as part of an operating system and executed by processor 202, in various implementations). OAM client 220 may comprise an application, service, server, daemon, routine, or other executable logic for monitoring OAM messages within an FlexE frame (e.g. monitor 220), extracting OAM messages and inserting or replacing the messages with FlexE idle blocks or similar data structures (e.g. extractor 224), and/or inserting OAM messages in place of FlexE idle blocks or similar data structures (e.g. inserter 226). Each of these components, as well as OAM client 220, may comprise hardware, software, or a combination of hardware and software. For example, in some implementations, an ASIC or FPGA may provide for extraction or insertion of OAM data within FlexE blocks. In some implementations, OAM client 220 may operate at higher layers of the network stack 212-218 in addition to physical layer 210, e.g. by providing OAM data via a payload of a transport layer or network layer packet in instances where a subsequent node cannot forward OAM data. FIG. 3A is a flow diagram of an implementation of a method of improved FlexE client OAM messaging for monitoring and isolating issues. In some implementations, at step 302, a computing device or node within a FlexE communications path may determine whether neighboring nodes have capability to insert and/or extract OAM messages. If both neighboring nodes lack capability, then in some implementations, the node may provide monitoring data to a monitoring server or other device via a secondary communication method or path (e.g. as part of a payload of a monitoring packet, within the header of another packet, etc.). If only a subsequent node lacks Insertion of OAM capabilities, then at step 306, the node may extract OAM data blocks from incoming frames and replace them with idle blocks. In some implementations, the extracted data may be provided separately to a monitoring server or other device as at step 308. If only a previous node lacks Insertion of OAM capabilities, then at step 304, the device may replace an idle block within an incoming FlexE frame with OAM data. The data may be generated locally by the device, or may be received via a separate means (e.g. via a payload of a monitoring packet, etc.).

If the neighboring nodes can forward OAM data, then at step 308, the device may monitor incoming OAM data. If the device has additional data to add (e.g. local delay measurements or error rate measurements, identifications of upstream connectivity faults, etc.), then at step 310, the OAM data in an incoming frame may be replaced with new data (e.g. comprising the locally generated data, and in some implementations, comprising both incoming data and the locally generated data, allowing both to be transmitted onwards). If not, at step 312, the device may forward the OAM data without modification.

Figure 3B:
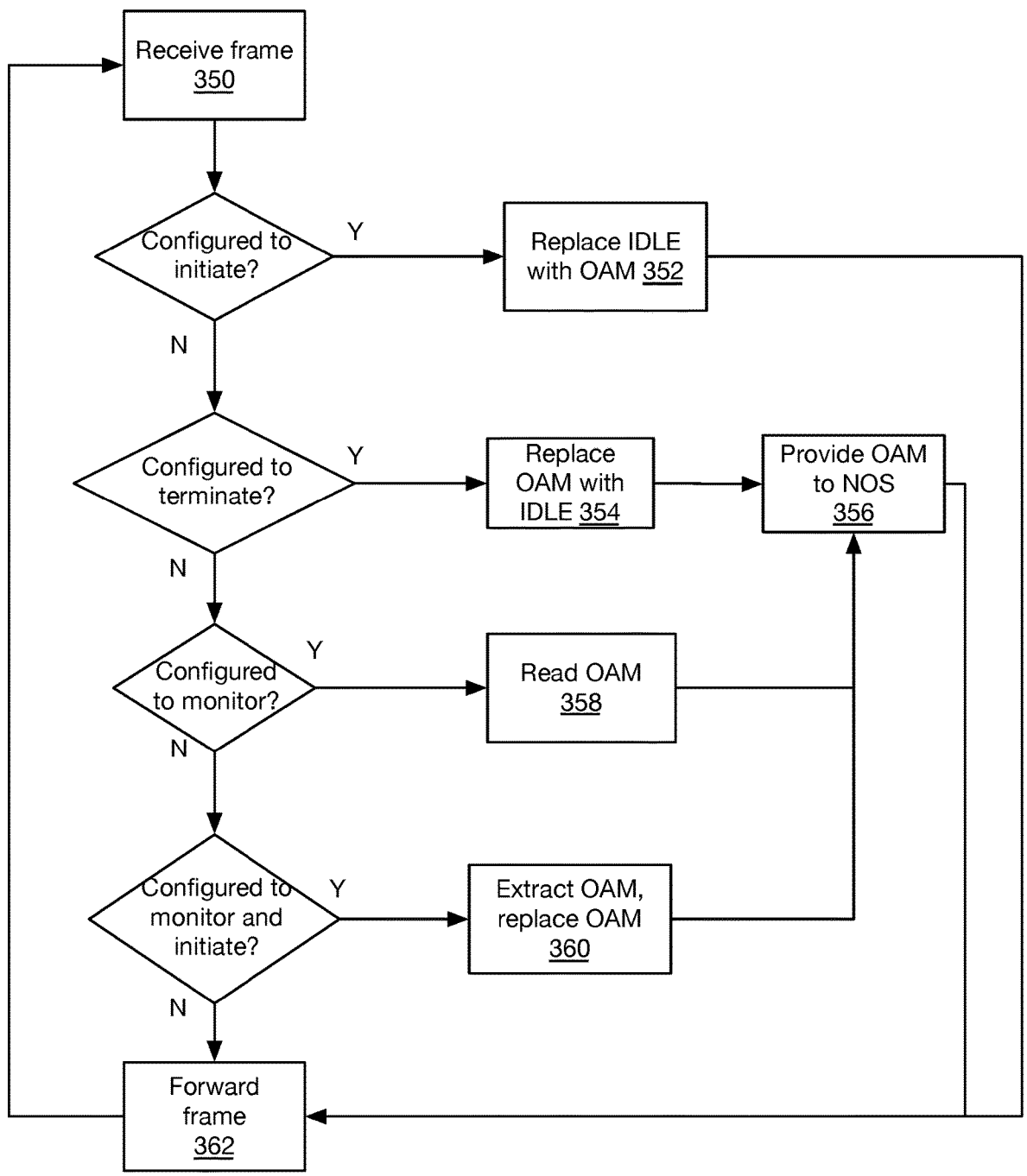
FIG. 3B is another flow diagram of an implementation of a method of improved FlexE client OAM messaging for monitoring and isolating issues.

FIG. 3B is another flow diagram of an implementation of a method of improved FlexE client OAM messaging for monitoring and isolating issues. At step 350, a node may receive a data frame. In some implementations, the frame may include OAM data or may include an IDLE block. The frame may be received from another FlexE device, or, in some implementations, from a non-FlexE network.

If the device is configured to initiate OAM, then at step 352, the device may replace an IDLE block in the received frame with OAM data, and may forward the frame onwards to its destination at step 362. If the device is configured to terminate OAM data, then at step 354, the device may extract and replace OAM data in the frame with an IDLE block. At step 356, the device may provide the extracted OAM data to a network operating system or monitoring server via a separate communication path. The frame, with the IDLE block replacing the OAM data, may be forwarded onwards at step 362.

If the device is configured to monitor OAM, then at step 358, the device may read the OAM data in the frame, without modifying or replacing the data. At step 358, the OAM data read from the frame may be provided to a network operating system or monitoring server via a separate communication path, and the frame may be forwarded at step 362.

If the device is configured to monitor and initiate OAM, then at step 360, the device may extract OAM data from the frame, and may insert locally generated OAM data into the frame to replace the extracted OAM data. The extracted OAM data may be provided to a network operating system or monitoring server via a separate communication path at step 356, and the frame, with the replaced locally-generated OAM data, may be forwarded onwards at step 362.

If the device is not configured to perform any OAM processing, then at step 362, the frame may be otherwise processed and/or forwarded onwards normally.

Accordingly, the presently described systems and methods allow for multiple intermediary nodes within a FlexE communication path to monitor and/or provide monitoring data, including locally generated measurement data or error identifications, improving over previous OAM systems that are limited to only end-to-end monitoring. This may allow administrators or users to identify malfunctioning links or nodes, even within the path, and recover faster from impairments.

In one aspect, the present disclosure is directed to a method for client-based operations, administration, and maintenance (OAM) management. The method includes receiving, by a device, an FlexE frame comprising an OAM block of data. The method also includes determining, by the device, that a second device receiving the FlexE frame lacks capability to forward the OAM block of data. The method also includes modifying, by the device, the OAM block of data in the FlexE frame, responsive to the determination. The method also includes transmitting, by the device, the modified FlexE frame.

In some implementations, the second device is a subsequent node in a transmission path of the FlexE frame, and modifying the OAM block of data includes: extracting, by the device, the OAM block of data, responsive to the determination that the second device receiving the FlexE frame lacks capability to forward the OAM block of data, and inserting, by the device, an idle block in place of the OAM block of data within the FlexE frame; and transmitting the modified FlexE frame further comprises transmitting the modified FlexE frame to the second device. In a further implementation, the device is configured to terminate OAM data. In another further implementation, the method includes transmitting the extracted OAM block of data to a third device via a secondary transmission path not including the second device. In still another further implementation, the method includes receiving, by the device from the second device, a second FlexE frame comprising an idle block; replacing, by the device, the idle block with OAM data; and transmitting, by the device, the modified FlexE frame to a third device, the third device having capability to forward the OAM data. In a still further implementation, the device is configured to initiate OAM data. In another still further implementation, the OAM data is either generated by the device or received from another device via a secondary transmission path not including the second device. In another further implementation, the method includes receiving, by the device from the second device lacking capability to forward OAM blocks of data, a second FlexE frame comprising an idle block; replacing, by the device, the idle block with OAM data; and transmitting, by the device, the modified second FlexE frame to a third device. In a further implementation, the method includes receiving the OAM data, by the device, via a secondary transmission path not including the second device. In another further implementation, the device is configured to initiate OAM data.

In another aspect, the present disclosure is directed to a system for client-based operations, administration, and maintenance (OAM) management. The system includes a device comprising a network interface in communication with a second device, and a processor. The processor is configured to: receive, via the network interface, an FlexE frame comprising an OAM block of data; determine that the second device lacks capability to forward the OAM block of data; modify the OAM block of data in the FlexE frame, responsive to the determination; and transmit, via the network interface, the modified FlexE frame.

In some implementations, the second device is a subsequent node in a transmission path of the FlexE frame, and the processor is further configured to: extract the OAM block of data, responsive to the determination that the second device receiving the FlexE frame lacks capability to forward the OAM block of data; insert an idle block in place of the OAM block of data within the FlexE frame; and transmit, via the network interface, the modified FlexE frame to the second device. In a further implementation, the device is configured to terminate OAM data. In another further implementation, the processor is further configured to transmit, via the network interface, the extracted OAM block of data to a third device via a secondary transmission path not including the second device. In another further implementation, the processor is further configured to: receive, via the network interface from the second device, a second FlexE frame comprising an idle block; replace the idle block with OAM data; and transmit, via the network interface, the modified FlexE frame to a third device, the third device having capability to forward the OAM data. In a still further implementation, the device is configured to initiate OAM data. In another still further implementation, the OAM data is either generated by the device or received from another device via a secondary transmission path not including the second device. In another further implementation, the processor is further configured to: receive, from the second device lacking capability to forward OAM blocks of data, a second FlexE frame comprising an idle block; replace the idle block with OAM data; and transmit the modified second FlexE frame to a third device. In a further implementation, the processor is further configured to receive the OAM data, via the network interface, via a secondary transmission path not including the second device. In another further implementation, the device is configured to initiate OAM data.

B. Computing and Network Environment

Figure 4A:
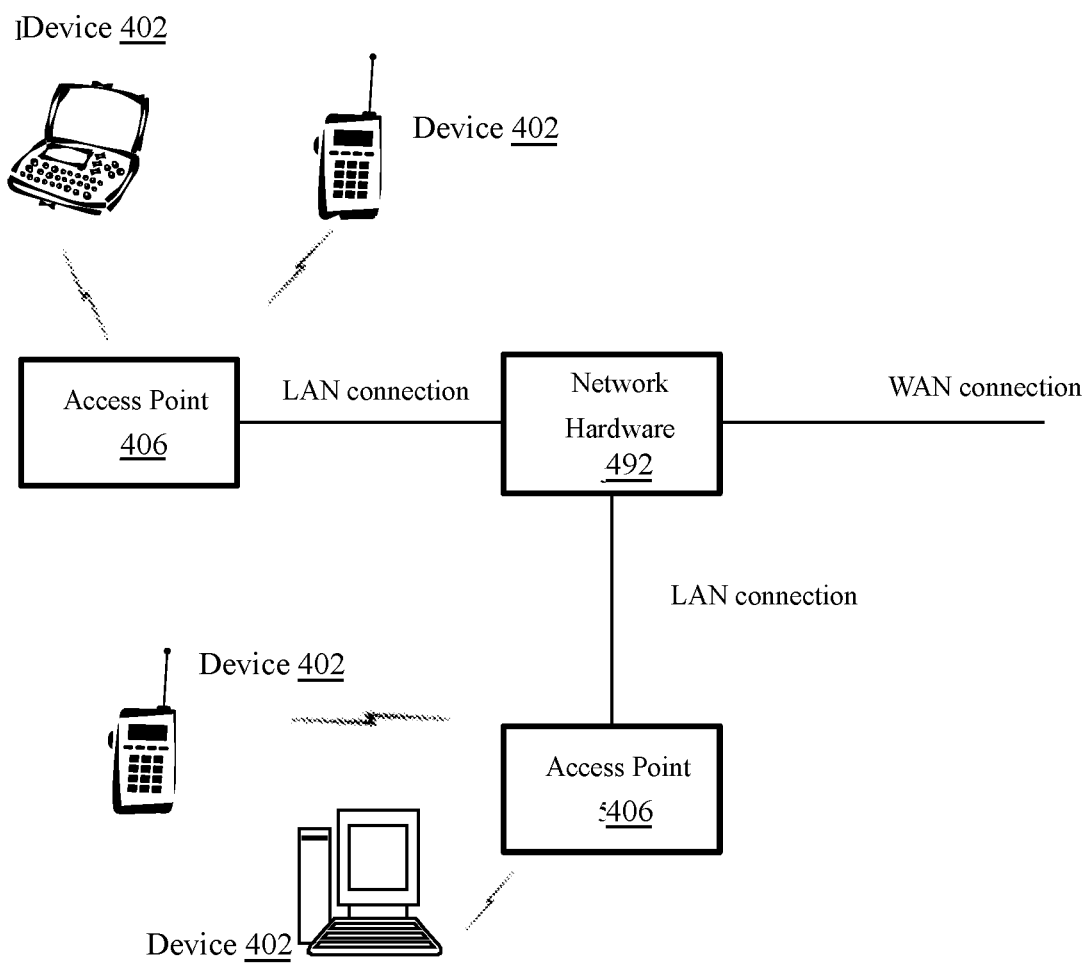
FIG. 4A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 4A, an embodiment of a network environment is depicted. In brief overview, the network environment includes a wireless communication system that includes one or more access points 406, one or more wireless communication devices 402 and a network hardware component 492. The wireless communication devices 402 may for example include laptop computers 402, tablets 402, personal computers 402 and/or cellular telephone devices 402. The details of an embodiment of each wireless communication device and/or access point are described in greater detail with reference to FIGS. 4B and 4C. The network environment can be an ad hoc network environment, an infrastructure wireless network environment, a subnet environment, etc. in one embodiment The access points (APs) 406 may be operably coupled to the network hardware 492 via local area network connections. The network hardware 492, which may include a router, gateway, switch, bridge, modem, system controller, appliance, etc., may provide a local area network connection for the communication system. Each of the access points 406 may have an associated antenna or an antenna array to communicate with the wireless communication devices 402 in its area. The wireless communication devices 402 may register with a particular access point 406 to receive services from the communication system (e.g., via a SU-MIMO or MU-MIMO configuration). For direct connections (e.g., point-to-point communications), some wireless communication devices 402 may communicate directly via an allocated channel and communications protocol. Some of the wireless communication devices 402 may be mobile or relatively static with respect to the access point 406.

In some embodiments an access point 406 includes a device or module (including a combination of hardware and software) that allows wireless communication devices 402 to connect to a wired network using Wi-Fi, or other standards. An access point 406 may sometimes be referred to as an wireless access point (WAP). An access point 406 may be configured, designed and/or built for operating in a wireless local area network (WLAN). An access point 406 may connect to a router (e.g., via a wired network) as a stand-alone device in some embodiments. In other embodiments, an access point can be a component of a router. An access point 406 can provide multiple devices 402 access to a network. An access point 406 may, for example, connect to a wired Ethernet connection and provide wireless connections using radio frequency links for other devices 402 to utilize that wired connection. An access point 406 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 406 may be used for (e.g., in-home or in-building) wireless networks (e.g., IEEE 802.11, Bluetooth, ZigBee, any other type of radio frequency based network protocol and/or variations thereof). Each of the wireless communication devices 402 may include a built-in radio and/or is coupled to a radio. Such wireless communication devices 402 and/or access points 406 may operate in accordance with the various aspects of the disclosure as presented herein to enhance performance, reduce costs and/or size, and/or enhance broadband applications. Each wireless communication devices 402 may have the capacity to function as a client node seeking access to resources (e.g., data, and connection to networked nodes such as servers) via one or more access points 406.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 4B:
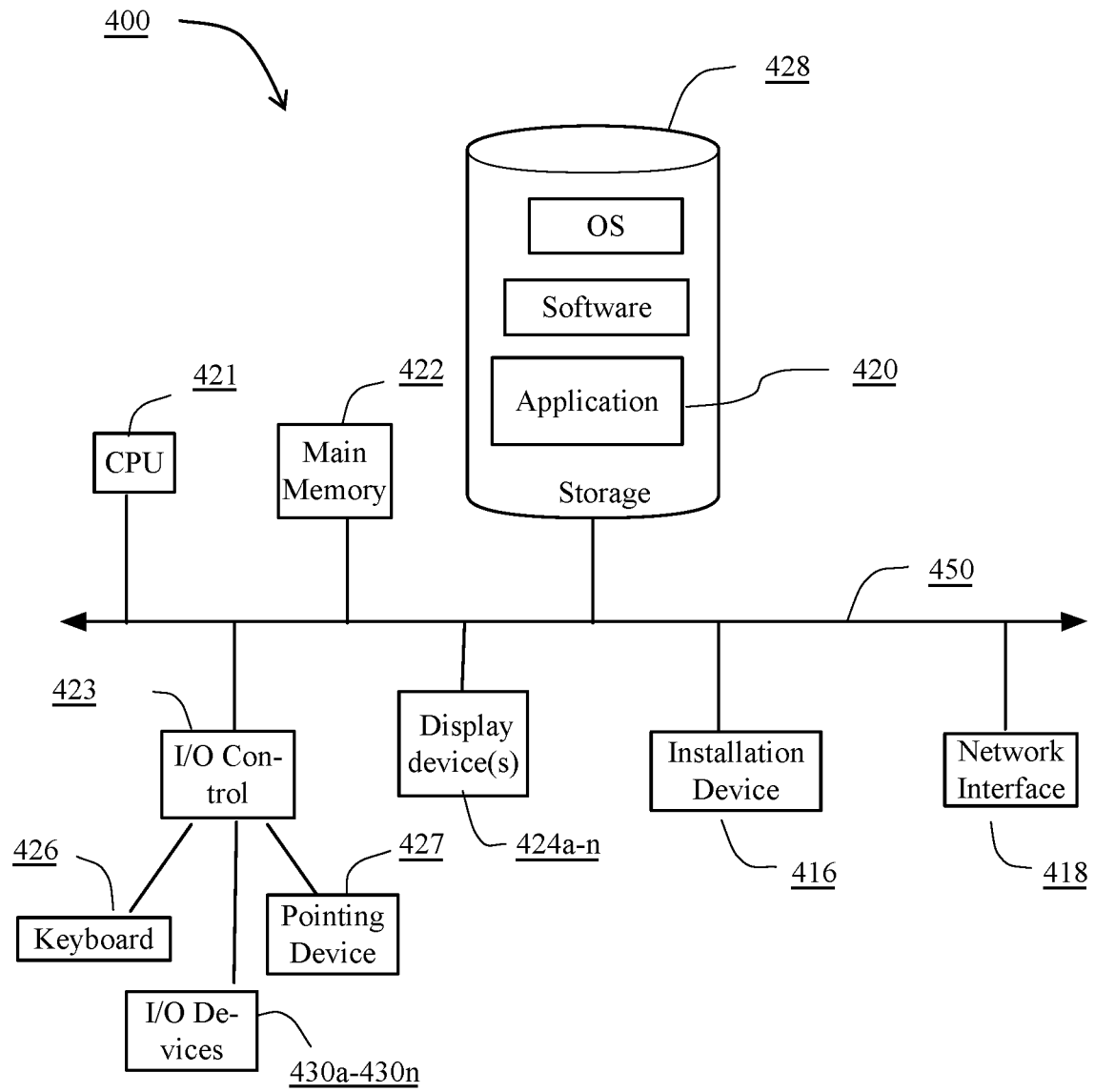
FIGS. 4B and 4C are block diagrams depicting embodiments of computing devices useful in connection with the methods and systems described herein.
Figure 4C:
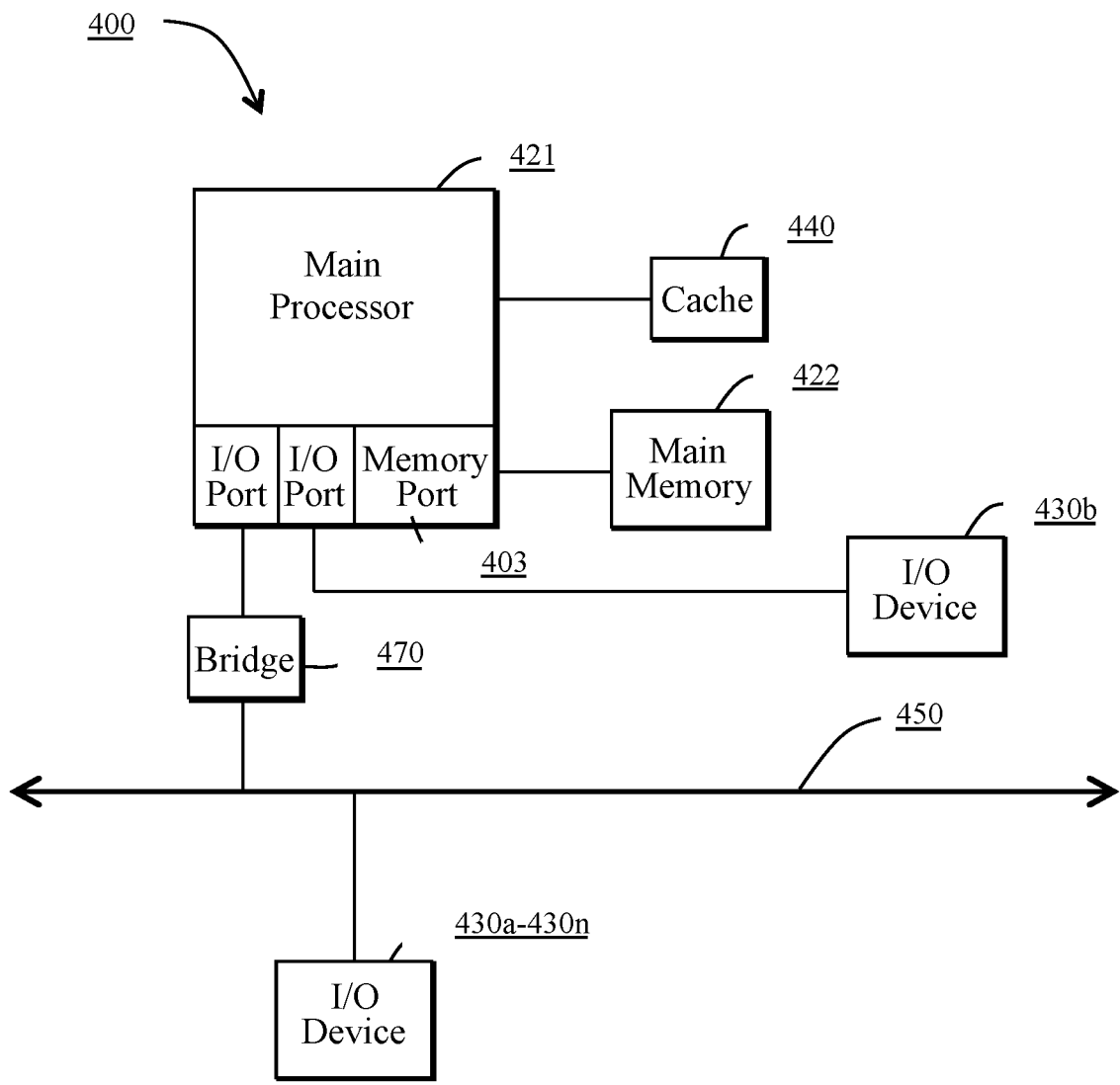

The communications device(s) 402 and access point(s) 406 may be deployed as and/or executed on any type and form of computing device, such as a computer, network device or appliance capable of communicating on any type and form of network and performing the operations described herein. FIGS. 4B and 4C depict block diagrams of a computing device 400 useful for practicing an embodiment of the wireless communication devices 402 or the access point 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4C, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4B, the processor 421 communicates with main memory 422 via a system bus 450 (described in more detail below). FIG. 4C depicts an embodiment of a computing device 400 in which the processor communicates directly with main memory 422 via a memory port 403. For example, in FIG. 4C the main memory 422 may be DRDRAM.

FIG. 4C depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4C, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 may communicate directly with I/O device 430b, for example via HYPERTRANSPORT, RAPIDIO, or INFINIBAND communications technology. FIG. 4C also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4B. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, Calif.

Referring again to FIG. 4B, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, FlexE, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4B and 4C may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method, comprising:
    receiving, by a device, a Flexible Ethernet (FlexE) frame comprising an operations, administration, and maintenance (OAM) block of data;
    determining, by the device, that a second device receiving the FlexE frame lacks capability to forward the OAM block of data, wherein the second device is a subsequent node in a transmission path of the FlexE frame;
    extracting, by the device, the OAM block of data, responsive to the determination that the second device receiving the FlexE frame lacks capability to forward the OAM block of data;
    inserting, by the device, an idle block in place of the OAM block of data within the FlexE frame;

transmitting, by the device, the FlexE frame including the inserted idle block to the second device lacking capability to forward the OAM block of data; and transmitting, by the device to a third device via a secondary transmission path, the extracted OAM block of data, wherein the third device receives the FlexE frame including the inserted idle block from the second device, and wherein the third device inserts the extracted OAM block of data received via the secondary transmission path into the FlexE frame received from the second device.

2. The method of claim 1, wherein the device is configured to terminate OAM data.

3. The method of claim 1, further comprising:
receiving, by the device from the second device, a second FlexE frame comprising the idle block;
replacing, by the device, the idle block with OAM data; and
transmitting, by the device, the FlexE frame to the third device, the third device having capability to forward the OAM data.

4. The method of claim 3, wherein the device is configured to initiate the OAM data.

5. The method of claim 3, wherein the OAM data is generated by the device.

6. The method of claim 1, wherein the second device is a previous node in the transmission path of the FlexE frame, wherein the OAM block of data comprises the idle block, and wherein extracting the OAM block of data and inserting the idle block further comprises replacing, by the device, the idle block with OAM data, responsive to the determination that the second device lacks capability to forward the OAM block of data; and
wherein transmitting the FlexE frame further comprises transmitting the FlexE frame to the third device that is the subsequent node in the transmission path of the FlexE frame.

7. The method of claim 6, further comprising receiving the OAM data, by the device, via the secondary transmission path not including the second device.

8. The method of claim 6, wherein the device is configured to initiate the OAM data.

9. A system, comprising:
a device comprising a network interface in communication with a second device, and a processor;
wherein the processor is configured to:
receive, via the network interface, an Ethernet frame comprising an operations, administration, and maintenance (OAM) block of data,
determine that the second device lacks capability to forward the OAM block of data, wherein the second device is a subsequent node in a transmission path of the Ethernet frame,
extract the OAM block of data, responsive to the determination that the second device receiving the Ethernet frame lacks capability to forward the OAM block of data,
insert an idle block in place of the OAM block of data within the Ethernet frame,
transmit, via the network interface, the Ethernet frame including the inserted idle block to the second device lacking capability to forward the OAM block of data, and
transmit, to a third device via a secondary transmission path, the extracted OAM block of data,
wherein the third device receives the Ethernet frame including the inserted idle block from the second device, and
wherein the third device inserts the extracted OAM block of data received via the secondary transmission path into the Ethernet frame received from the second device.

10. The system of claim 9, wherein the device is configured to terminate OAM data.

11. The system of claim 9, wherein the processor is further configured to:
receive, via the network interface from the second device, a second Ethernet frame comprising the idle block;
replace the idle block with OAM data; and
transmit, via the network interface, the Ethernet frame to the third device, the third device having capability to forward the OAM data.

12. The system of claim 11, wherein the device is configured to initiate the OAM data.

13. The system of claim 11, wherein the OAM data is generated by the device.

14. The system of claim 9, wherein the second device is a previous node in the transmission path of the Ethernet frame, wherein the OAM block of data comprises the idle block, and wherein the processor is further configured to:
replace the idle block with OAM data, responsive to the determination that the second device lacks capability to forward the OAM block of data; and
transmit, via the network interface, the Ethernet frame to the third device that is the subsequent node in the transmission path of the Ethernet frame.

15. The system of claim 14, wherein the processor is further configured to receive the OAM data, via the network interface, via the secondary transmission path not including the second device.

16. The system of claim 14, wherein the device is configured to initiate the OAM data.

* * * * *